United States Patent
Murakami et al.

(10) Patent No.: US 12,556,379 B2
(45) Date of Patent: Feb. 17, 2026

(54) QKD SYSTEM, ELECTRONIC APPARATUS, MULTIPLEXING APPARATUS, AND COMPUTER PROGRAM PRODUCT

(71) Applicant: KABUSHIKI KAISHA TOSHIBA, Tokyo (JP)

(72) Inventors: Akira Murakami, Tokyo (JP); Yoshimichi Tanizawa, Kanagawa (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 305 days.

(21) Appl. No.: 18/175,377

(22) Filed: Feb. 27, 2023

(65) Prior Publication Data
US 2024/0031138 A1    Jan. 25, 2024

(30) Foreign Application Priority Data
Jul. 22, 2022    (JP) .................................. 2022-116933

(51) Int. Cl.
*H04L 29/06* (2006.01)
*G06N 10/40* (2022.01)
*H04L 9/08* (2006.01)

(52) U.S. Cl.
CPC ........... *H04L 9/0852* (2013.01); *G06N 10/40* (2022.01)

(58) Field of Classification Search
None
See application file for complete search history.

(56) References Cited

U.S. PATENT DOCUMENTS

| | | | |
|---|---|---|---|
| 7,613,396 B2 | 11/2009 | Maeda et al. | |
| 7,826,749 B2 * | 11/2010 | Luo | H04J 14/0246 380/278 |
| 8,184,989 B2 * | 5/2012 | Maeda | H04B 10/548 380/278 |

(Continued)

FOREIGN PATENT DOCUMENTS

| | | |
|---|---|---|
| CN | 113497703 A | 10/2021 |
| JP | H5-129987 A | 5/1993 |

(Continued)

OTHER PUBLICATIONS

Japan Patent Office, Office Action in JP App. No. 2022-116933 (Aug. 12, 2025).

*Primary Examiner* — Maung T Lwin
(74) *Attorney, Agent, or Firm* — Finnegan, Henderson, Farabow, Garrett & Dunner, LLP

(57) ABSTRACT

According to one embodiment, a QKD system includes transmitters configured to transmit quantum signals and classical signals. An electronic apparatus receives transmission statuses of optical fibers. The optical fibers includes a first optical fiber in which the quantum signals are wavelength-multiplexed and a second optical fiber in which the classical signals are wavelength-multiplexed. The electronic apparatus receives a transmission status of the quantum signals flowing through the first optical fiber and a transmission status of the classical signals flowing through the second optical fiber, and issues, to at least one of a first multiplexing apparatus and the second multiplexing apparatus, an instruction to switch the first optical fiber or the second optical fiber to another optical fiber selected from the optical fibers according to a receiving result.

10 Claims, 11 Drawing Sheets

(56) References Cited

U.S. PATENT DOCUMENTS

| | | | |
|---|---|---|---|
| 8,683,192 B2* | 3/2014 | Ayling | H04B 10/70 713/153 |
| 10,461,879 B2* | 10/2019 | Yuki | H04Q 11/0005 |
| 10,567,089 B2* | 2/2020 | Murakami | H04B 10/516 |
| 10,778,341 B2* | 9/2020 | Su | H04J 14/0305 |
| 11,615,213 B2* | 3/2023 | Han | G06F 21/602 713/193 |
| 12,052,351 B1* | 7/2024 | Buck, Jr. | H04L 9/0852 |
| 2005/0025416 A1* | 2/2005 | Hallemeier | G02B 6/14 385/24 |
| 2007/0065155 A1 | 3/2007 | Luo et al. | |
| 2007/0212066 A1* | 9/2007 | Winh | H04Q 11/0062 398/45 |
| 2008/0013738 A1* | 1/2008 | Tajima | H04L 9/0852 380/278 |
| 2008/0137858 A1* | 6/2008 | Gelfond | H04B 10/70 380/256 |
| 2009/0074192 A1* | 3/2009 | Beal | H04L 9/0858 380/278 |
| 2009/0180616 A1* | 7/2009 | Brodsky | H04J 14/0283 380/278 |
| 2009/0269057 A1* | 10/2009 | Tanaka | H04J 14/0282 398/34 |
| 2011/0182428 A1* | 7/2011 | Zhao | H04L 9/0852 380/256 |
| 2012/0177201 A1* | 7/2012 | Ayling | H04L 9/0858 380/278 |
| 2015/0098697 A1* | 4/2015 | Marom | G02B 6/2848 398/44 |
| 2018/0269989 A1 | 9/2018 | Murakami et al. | |
| 2019/0379463 A1 | 12/2019 | Shields et al. | |
| 2020/0044835 A1 | 2/2020 | Legre et al. | |
| 2020/0067601 A1* | 2/2020 | Kikawada | H04B 10/506 |
| 2020/0389299 A1* | 12/2020 | White | H04B 10/85 |
| 2021/0105135 A1* | 4/2021 | Figueroa | H04L 9/0855 |
| 2022/0085987 A1* | 3/2022 | Deb | G06F 13/4282 |

FOREIGN PATENT DOCUMENTS

| | | | | |
|---|---|---|---|---|
| JP | 2009-509367 A | 3/2009 | | |
| JP | 4784202 B2 | 10/2011 | | |
| JP | 2018-157405 A | 10/2018 | | |
| JP | 2019-537863 A | 12/2019 | | |
| WO | WO 2016/112086 A1 | 7/2016 | | |
| WO | WO-2018224164 A1 * | 12/2018 | | H04L 9/0855 |

* cited by examiner

QKD SYSTEM, ELECTRONIC APPARATUS, MULTIPLEXING APPARATUS, AND COMPUTER PROGRAM PRODUCT

CROSS-REFERENCE TO RELATED APPLICATIONS

This application is based upon and claims the benefit of priority from Japanese Patent Application No. 2022-116933, filed on Jul. 22, 2022; the entire contents of which are incorporated herein by reference.

FIELD

Embodiments described herein relate generally to a QKD system, an electronic apparatus, a multiplexing apparatus, and a computer program product.

BACKGROUND

A quantum key distribution technology (Quantum Key Distribution, hereinafter referred to as QKD) is a technology by which an encryption key is securely shared between a transmitter that continuously transmits a single photon and a receiver that receives the single photon, which are connected by an optical fiber. An encryption key shared by QKD is guaranteed not to be eavesdropped based on the principle of quantum mechanics. It is guaranteed by information theory that data that is subjected to encrypted data communication using a cryptographic communication method called a one-time pad using a shared encryption key cannot be decrypted by an eavesdropper having any knowledge.

However, in the related art, it is difficult to continue transmission of an encryption key even when a defect such as disconnection occurs in an optical fiber while improving the transmission speed of the encryption key by optical wavelength multiplexing with a limited number of optical fibers.

DETAILED DESCRIPTION

A QKD system according to an embodiment includes a plurality of transmitters, a plurality of receivers, a first multiplexing apparatus, a second multiplexing apparatus, a plurality of optical fibers, and an electronic apparatus. The transmitters are configured to transmit a plurality of quantum signals including encryption key information shared by quantum key distribution (QKD) and a plurality of classical signals including control information of the QKD. The receivers are configured to receive the plurality of quantum signals and the plurality of classical signals. The first multiplexing apparatus is configured to be connected to the plurality of transmitters. The second multiplexing apparatus is configured to be connected to the plurality of receivers. The optical fibers are configured to connect the first multiplexing apparatus and the second multiplexing apparatus. The electronic apparatus is configured to receive transmission statuses of the plurality of optical fibers. The optical fibers include a first optical fiber in which the plurality of quantum signals is wavelength-multiplexed and a second optical fiber in which the plurality of classical signals is wavelength-multiplexed. The electronic apparatus is configured to receive transmission statuses of the plurality of quantum signals flowing through the first optical fiber and transmission statuses of the plurality of classical signals flowing through the second optical fiber, and issue, to at least one of the first multiplexing apparatus and the second multiplexing apparatus, an instruction to switch the first optical fiber or the second optical fiber to another optical fiber selected from the plurality of optical fibers according to a receiving result.

Hereinafter, embodiments of a QKD system, an electronic apparatus, a multiplexing apparatus (an electronic apparatus), and a computer program product are described in detail with reference to the accompanying drawings.

Hereinafter, an encryption key exchanging device using a quantum key distribution (QKD) technology is referred to as a QKD device (a QKD component). An encryption key exchange system configured with a plurality of QKD components is referred to as a QKD system. First, an example of a general QKD system is described.

Figure 1:
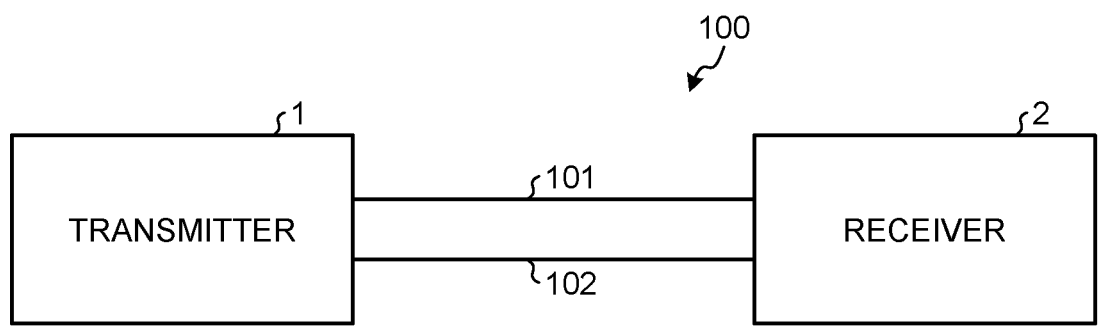
FIG. 1 is a diagram illustrating a configuration example of one general QKD system.

FIG. 1 is a diagram illustrating a configuration example of one general QKD system. A general QKD system 100 includes a transmitter 1, a receiver 2, and two optical fibers 101 and 102.

The transmitter 1 is a QKD component on a transmission side. The transmitter 1 generates a photon, encodes encryption key information indicating bit information of 0 or 1 in the photon, and transmits the photon in which the encryption key information is encoded to the receiver 2.

The receiver 2 is a QKD component on a reception side. The receiver 2 receives the photon transmitted from the transmitter 1 and decodes the encryption key information.

The optical fiber 101 is used as a quantum communication path for transmitting a quantum signal encoded with encryption key information.

The optical fiber 102 is used as a classical communication path for transmitting a classical signal including QKD control information. For example, the classical communication path is used for transmission of a synchronization signal between a transmitter of the photon used in the transmitter 1 and a receiver of photons used in the receiver 2 and an optical signal such as data communication.

Since the quantum signal in the quantum communication path is extremely weaker than the optical signal in the classical communication path, the optical fibers 101 and 102 which are physically different are generally used for the quantum communication path and the classical communication path. In addition, in order to transmit a signal dedicated to the QKD component, the optical fiber 101 of the quantum communication path and the optical fiber 102 of the classical communication path need to be dark fibers.

Figure 2:
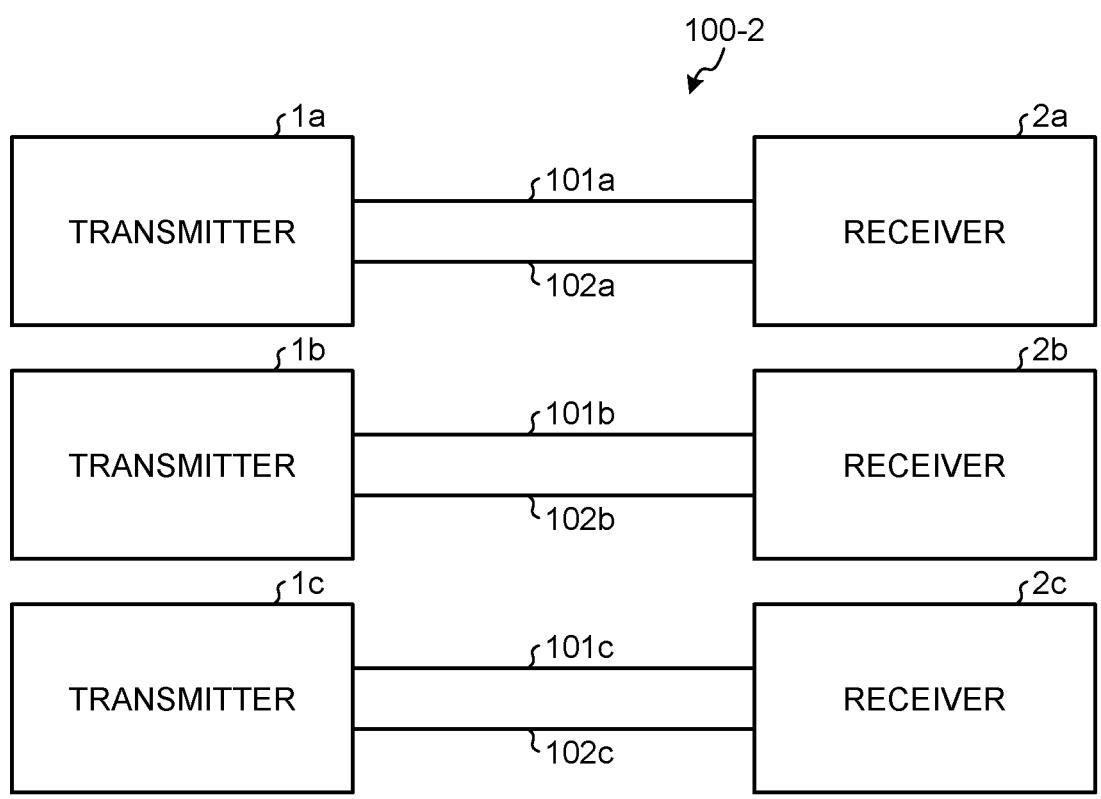
FIG. 2 is a diagram illustrating a configuration example of a QKD system using a plurality of QKD components.

FIG. 2 is a diagram illustrating a configuration example of a QKD system 100-2 including a plurality of QKD components. In the QKD system 100-2, the number of QKD components is increased in order to improve the transmission speed of a shared encryption key, and thus the transmission speed of the encryption key in the entire QKD system 100-2 is improved. As illustrated in FIG. 2, for example, the transmission speed of the encryption key when three QKD systems are used is 3 times faster than that when one QKD system 100 (FIG. 1) is used. However, in this case, the number of optical fibers required increases. It is not practical to increase the number of optical fibers required for socially implementing a QKD system.

Therefore, there is a method of embodying a quantum communication path and a classical communication path with one optical fiber by using an optical wavelength multiplexing technology (JP 4784202 B2). By shifting the wavelength of an optical signal of the quantum communication path and the wavelength of an optical signal of the classical communication path, even when the same optical fiber is transmitted, it is possible to transmit an encryption key by QKD without interfering with each other. With this technology, one optical fiber is required for one QKD system.

Figure 3:
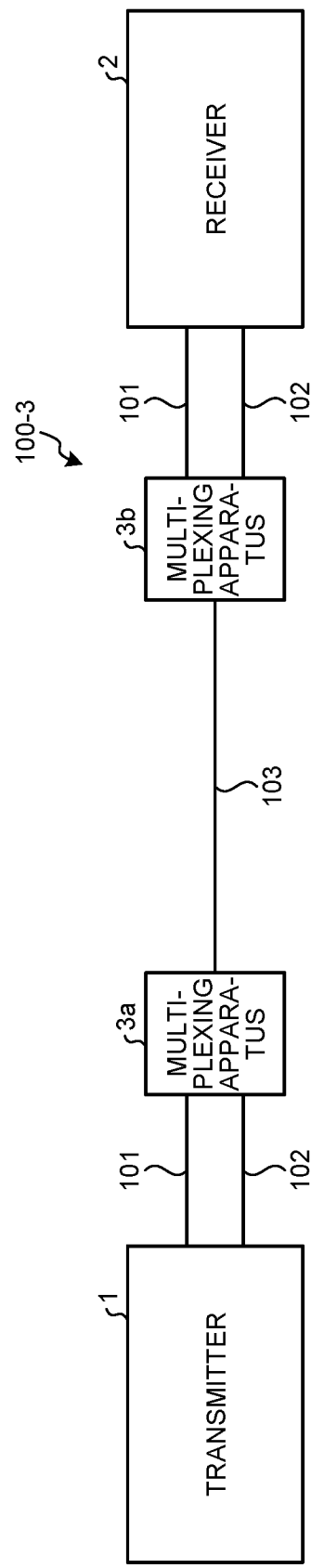
FIG. 3 is a diagram illustrating Example 1 in case of using an optical wavelength multiplexing technology.

FIG. 3 is a diagram illustrating Example 1 in case of using the optical wavelength multiplexing technology. In a QKD system 100-3 of FIG. 3, multiplexing apparatuses 3a and 3b that wavelength-multiplex optical signals and an optical fiber 103 are used in addition to a normal QKD component (the transmitter 1 and the receiver 2), an optical fiber 101 used as the quantum communication path, and an optical fiber 102 used as the classical communication path.

The transmitter 1 and the multiplexing device 3a, and the receiver 2 and the multiplexing apparatus 3b are arranged in, for example, the same rack and connected by a short optical fiber. The multiplexing apparatuses 3a and 3b are connected by an optical fiber 103 corresponding to a communication distance similarly to the normal QKD component.

However, in Example 1 of FIG. 3, it is required to wavelength-multiplex optical signals having different intensities, which is technically difficult. Therefore, as illustrated in FIG. 4, a method of wavelength-multiplexing optical fibers 101a to 101c of the quantum communication path into one optical fiber 101d and wavelength-multiplexing optical fibers 102a to 102c of the classical communication path into one optical fiber 102d is also considered.

Figure 4:
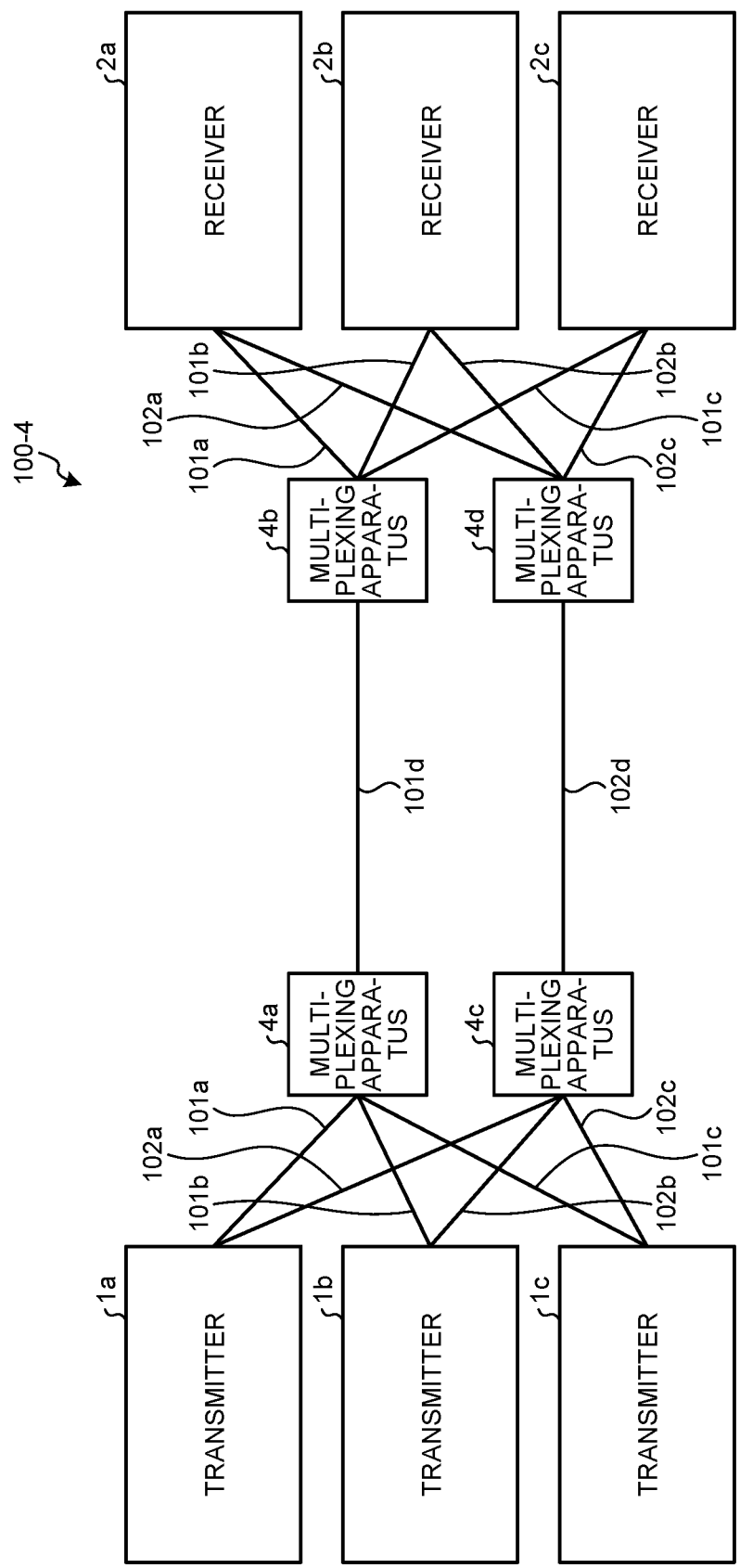
FIG. 4 is a diagram illustrating Example 2 in case of using an optical wavelength multiplexing technology.

FIG. 4 is a diagram illustrating Example 2 in case of using the optical wavelength multiplexing technology. In a QKD system 100-4 of FIG. 4, multiplexing apparatuses 4a and 4b wavelength-multiplex the optical signals of the optical fibers 101a to 101c used for the quantum communication paths and multiplexing apparatuses 4c and 4d wavelength-multiplex the optical signals of the optical fibers 102a to 102c used for the classical communication paths.

It is easier to wavelength-multiplex optical signals having the same intensity as in the QKD system 100-4 of FIG. 4 than to wavelength-multiplex optical signals having different intensities as in the QKD system 100-3 of FIG. 3. In the wavelength multiplexing method illustrated in FIG. 3, when the number of QKD components used to improve the transmission speed of the encryption key is increased, the number of the required optical fibers 103 also increases in proportion to the number of QKD components. Meanwhile, in the wavelength multiplexing method illustrated in FIG. 4, even if the number of QKD components that performs wavelength multiplexing increases, the number of required optical fibers remains two, and thus the mounting cost is suppressed. As a disadvantage of the wavelength multiplexing method illustrated in FIG. 4, when one optical fiber is disconnected, all the QKD components do not operate. That is, when at least one optical fiber between the multiplexing apparatuses is disconnected, the transmission of the encryption key by the QKD components is stopped.

First Embodiment

Hereinafter, an embodiment of a QKD system capable of continuing transmission of an encryption key even when a defect such as disconnection occurs in an optical fiber while improving a transmission speed of an encryption key by optical wavelength multiplexing with a limited number of optical fibers is described.

Example of Component Configuration

Figure 5:
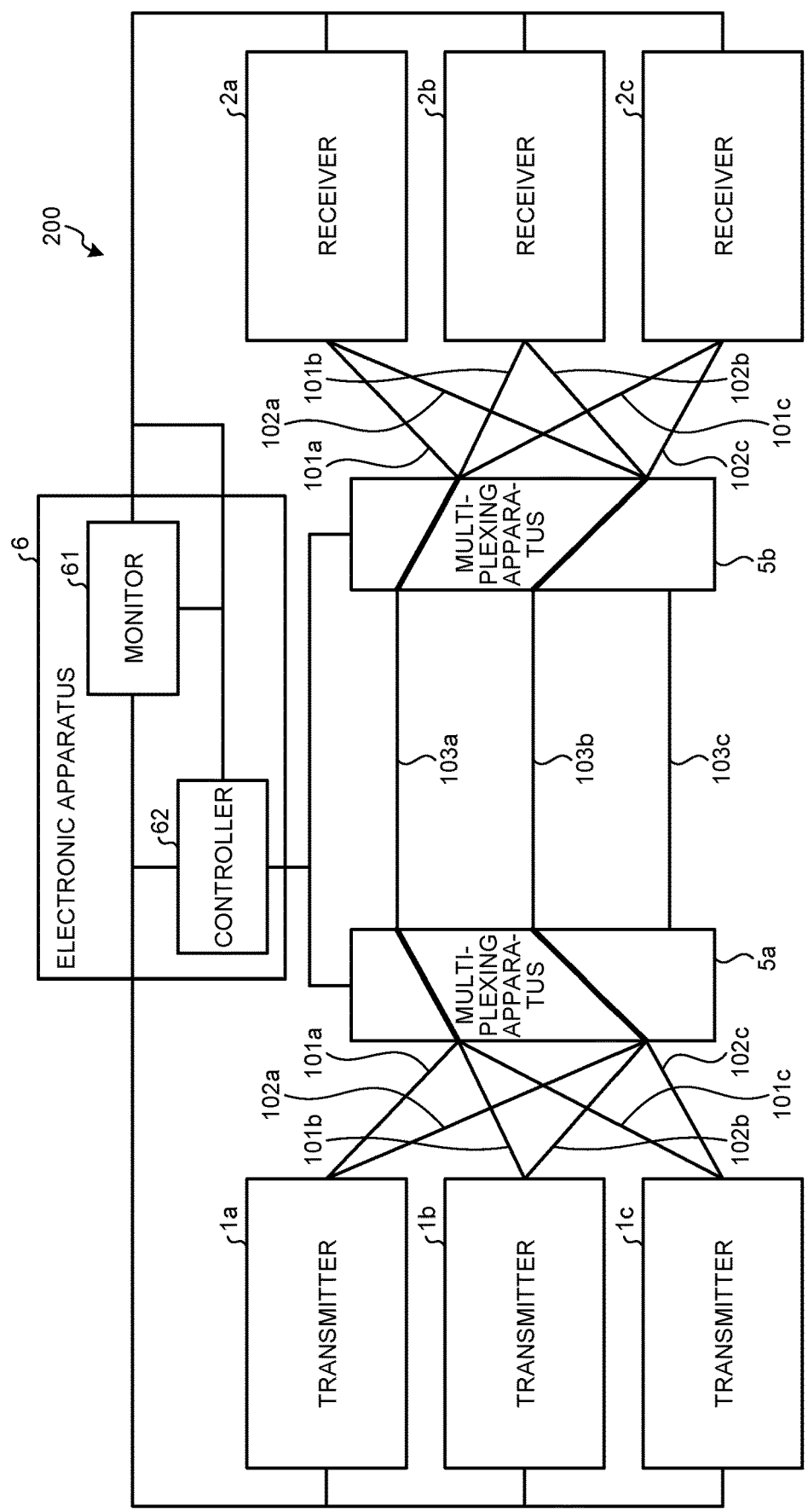
FIG. 5 is a diagram illustrating an example of a device configuration of a QKD system according to a first embodiment.

FIG. 5 is a diagram illustrating an example of a component configuration of a QKD system 200 according to a first embodiment. A QKD system 200 of the first embodiment includes transmitters 1a to 1c, receivers 2a to 2c, multiplexing apparatuses 5a and 5b, and an electronic apparatus 6. Note that the number of each of the transmitters 1a to 1c and the receivers 2a to 2c is not limited to three and may be any number. The multiplexing apparatuses 5a and 5b are connected by three optical fibers 103a to 103c. Hereinafter, when the optical fibers 103a to 103c are not distinguished, the optical fibers 103a to 103c are simply referred to as the optical fibers 103.

The multiplexing apparatus 5a is installed on the transmission side and is connected to the quantum communication paths and the classical communication paths of the plurality of transmitters 1a to 1c. The multiplexing apparatus 5b is installed on the reception side and is connected to the quantum communication paths and the classical communication paths of the plurality of receivers 2a to 2c. The multiplexing apparatuses 5a and 5b wavelength-multiplex a plurality of quantum communication paths into one optical fiber 103 and a plurality of classical communication paths into one optical fiber 103.

The multiplexing apparatuses 5a and 5b are connected by three or more optical fibers 103 (the optical fibers 103a to 103c in the example of FIG. 5) and have a function of switching the optical fibers 103 to be used for performing encryption key transmission by the QKD. That is, the multiplexing apparatuses 5a and 5b have a function of switching the optical fibers 103a to 103c to be used as the quantum communication path and the classical communication path in addition to the function of optical wavelength multiplexing. The multiplexing apparatuses 5a and 5b switch the plurality of optical fibers 103a to 103c between the multiplexing apparatuses 5a and 5b to determine the optical fiber 103 used as the quantum communication path and the optical fiber 103 used as the classical communication path.

Normally, when an encryption key is transmitted by the QKD by using two optical fibers 103 and the optical fiber 103 unused is also secured as a reserve, the number of optical fibers 103 between the multiplexing apparatuses 5a and 5b is required to be more than two. For example, in the example of FIG. 5, the optical fiber 103a is used as a quantum communication path, the optical fiber 103b is used as a classical communication path, and the optical fiber 103c is secured as a reserve.

The electronic apparatus 6 includes a monitor 61 and a controller 62.

The monitor 61 monitors transmission statuses of the encryption keys of the QKD components (the transmitters 1a to 1c and the receivers 2a to 2c). For example, the monitor 61 monitors the transmission statuses of the plurality of quantum signals flowing through the optical fiber 103a by receiving at least one of the encryption key generation speed based on the quantum signal and the error rate of the quantum signal from the plurality of receivers 2a to 2c. For example, when the monitor 61 detects the stop of transmission of the encryption key in each QKD component due to disconnection of the optical fiber 103a or the like, the monitor notifies the controller 62 of the stop of transmission of the encryption key.

The controller 62 switches the optical fibers 103 used by the multiplexing apparatuses 5a and 5b according to the transmission status of the encryption key of each QKD component by the monitor 61. For example, when receiving the notification of the stop of the transmission of the encryption key from the monitor 61, the controller 62 transmits an instruction to switch the optical fiber 103a used as the quantum communication path to the optical fiber 103c to the multiplexing apparatuses 5a and 5b.

Note that, in the example of FIG. 5, the configuration when the three QKD systems are subjected to the optical wavelength multiplexing is illustrated, but the number of QKD systems to be multiplexed may be two or more.

Hereinafter, when the multiplexing apparatuses 5a and 5b are not distinguished from each other, the multiplexing apparatuses 5a and 5b are simply referred to as the multiplexing apparatuses 5.

Example of Functional Configuration of Multiplexing Apparatus

Figure 6:
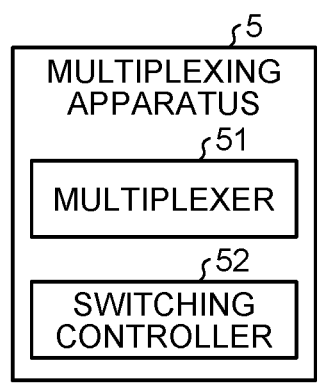
FIG. 6 is a diagram illustrating an example of a functional configuration of a multiplexing apparatus according to the first embodiment.

FIG. 6 is a diagram illustrating an example of a functional configuration of the multiplexing apparatus 5 according to the first embodiment. The multiplexing apparatus 5 of the first embodiment includes a multiplexer 51 and a switching controller 52.

The multiplexer 51 receives a plurality of quantum signals including encryption key information shared by the QKD and a plurality of classical signals including control information of the QKD from a plurality of QKD components (transmitters 1a to 1c). Then, the multiplexer 51 wavelength-multiplexes the plurality of quantum signals by using the optical fiber 103a (first optical fiber) selected from the plurality of optical fibers 103 and wavelength-multiplexes the plurality of quantum signals by using the optical fiber 103b (second optical fiber) selected from the plurality of optical fibers 103.

In response to the switching instruction from the electronic apparatus 6, the switching controller 52 switches the optical fiber 103a (first optical fiber) or the optical fiber 103b (second optical fiber) to another optical fiber (the optical fiber 103c in the example of FIG. 5) selected from the plurality of optical fibers 103.

Figure 7:
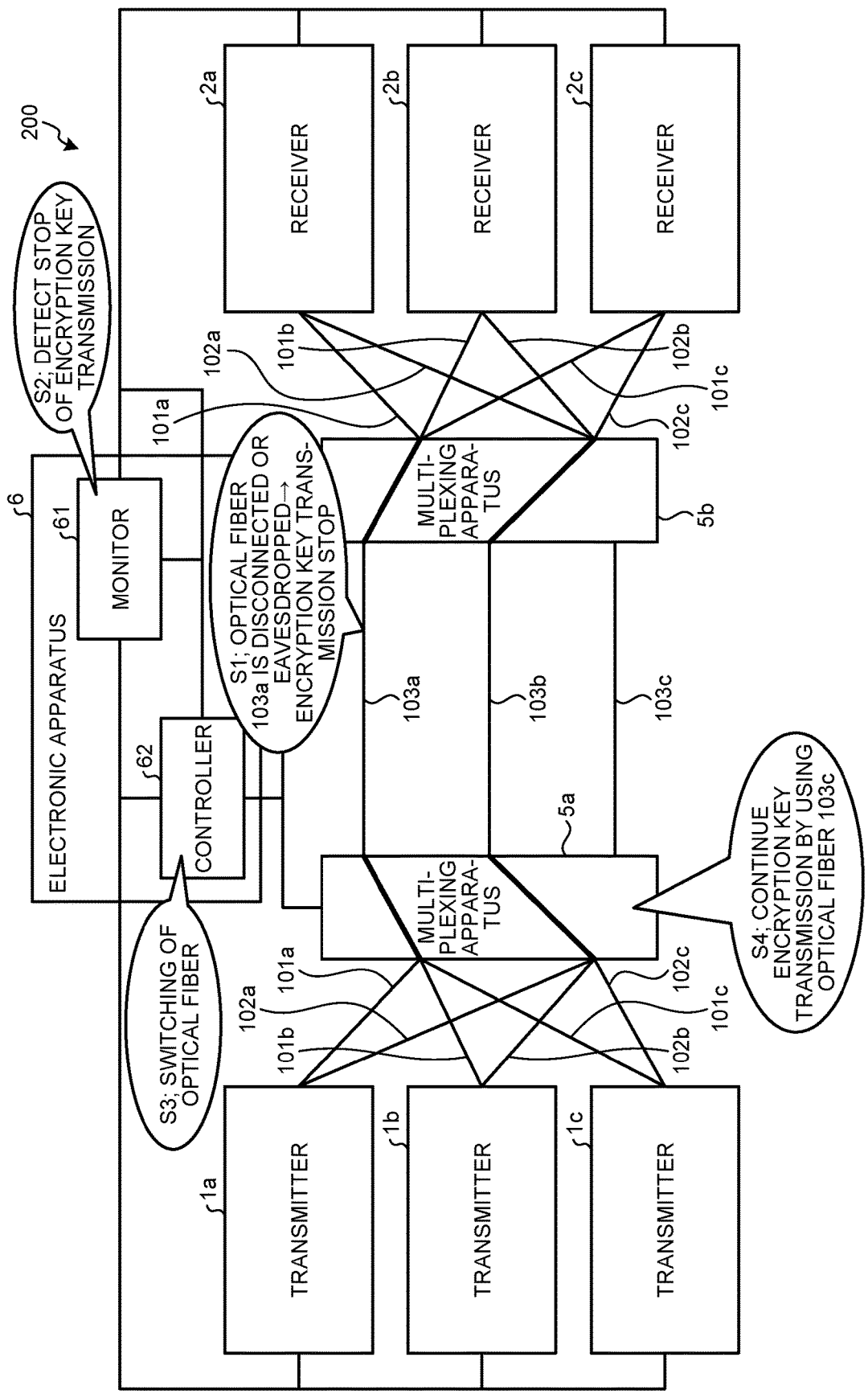
FIG. 7 is a diagram illustrating an example of optical fiber switching control according to the first embodiment.

FIG. 7 is a diagram illustrating an example the switching control of the optical fibers 103a to 103c according to the first embodiment. It is assumed that the quantum communication paths (the optical fibers 101a to 101c) of three QKD systems are multiplexed in the optical fiber 103a, the classical communication paths (the optical fibers 102a to 102c) are multiplexed in the optical fiber 103b, and the optical fiber 103c is unused.

It is assumed that the transmission of the encryption key cannot be continued because the optical fiber 103a is disconnected or eavesdropped for some reason (Step S1). Then, the monitor 61 detects that the transmission status of the encryption key of each of the QKD components (the transmitters 1a to 1c and the receivers 2a to 2c) are in the transmission stop state (Step S2) and notifies the controller 62 of the detection result.

At this time, the monitor 61 may notify not only the transmission stop state of the encryption key but also the operation information of the QKD component relating to the detection result. For example, the operation information of the QKD component is the number of photon detections, a quantum bit error rate (QBER), an encryption key transmission speed (otherwise, an encryption key sharing speed, or an encryption key generation speed), and the like. As a relationship between the QBER (the error rate of the quantum signal) and the encryption key transmission speed, there is a relationship in which the encryption key transmission speed decreases when the QBER increases.

Based on the notification from the monitor 61, the controller 62 issues, to at least one of the multiplexing apparatuses 5a and 5b, an instruction to switch the quantum communication path not to the optical fiber 103a but to the unused optical fiber 103c (Step S3).

When receiving the instruction from the controller 62, the switching controller 52 of each of the multiplexing apparatuses 5a and 5b switches the quantum communication path not to the optical fiber 103a but to the unused optical fiber 103c. As a result, transmission of the encryption key is continued (Step S4).

Note that the controller 62 can also issue the instruction to switch the classical communication path in the same manner as in the case of the quantum communication path described above, and the multiplexing apparatuses 5a and 5b can also switch the classical communication path in the same manner as in the case of the quantum communication path described above.

According to the switching control of the optical fiber 103 illustrated in FIG. 7, the transmission of the encryption key can be continued even when there is a defect in the optical fiber 103, and the redundancy is improved. Note that the plurality of optical fibers 103 may be three or more and may include at least one unused optical fiber 103.

Figure 8:
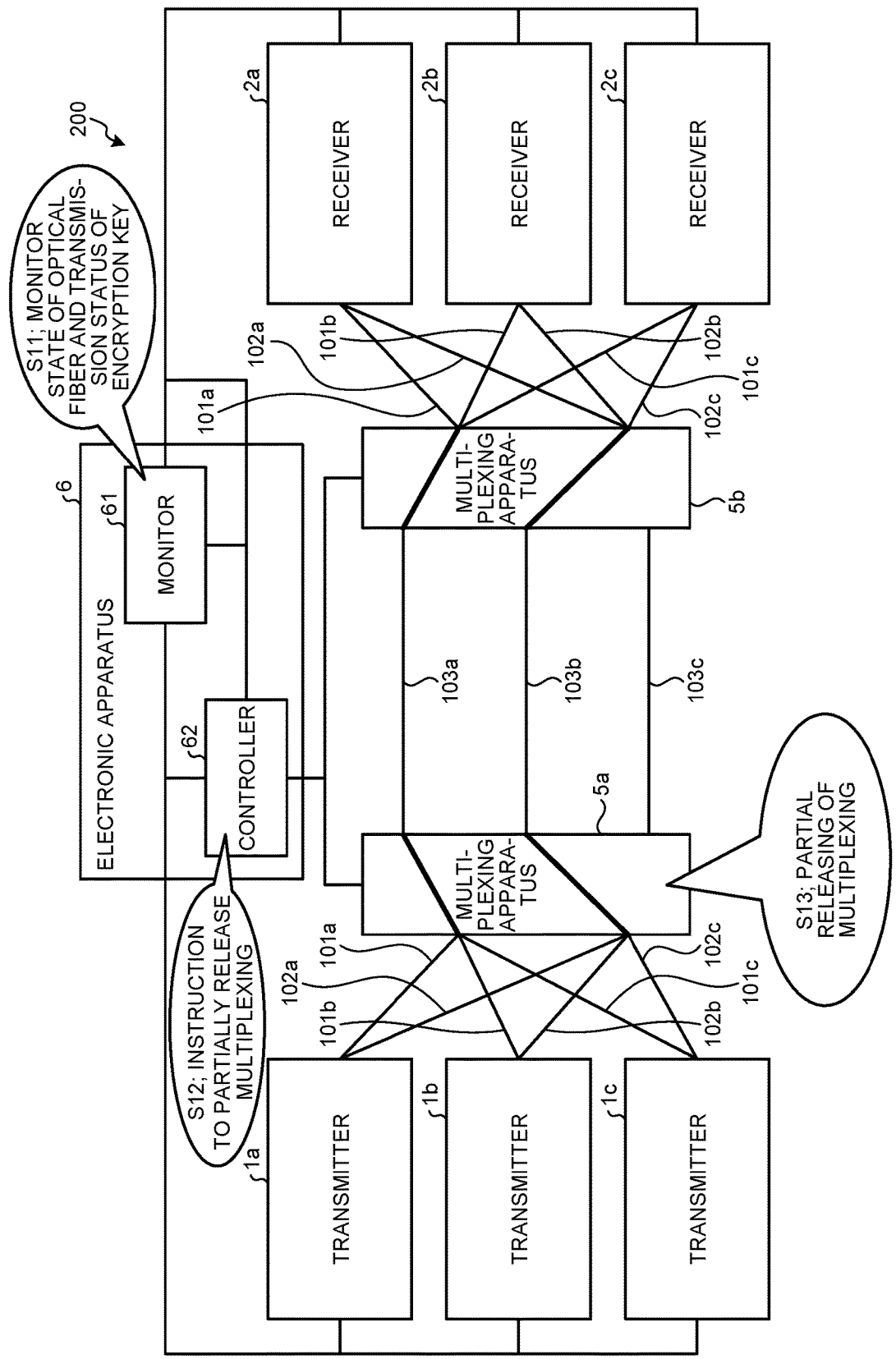
FIG. 8 is a diagram illustrating an example of multiplexing control according to the first embodiment.

FIG. 8 is a diagram illustrating an example of multiplexing control according to the first embodiment. The optical wavelength multiplexing on the quantum signals having the same optical intensity, can suppress deterioration of an error rate (QBER) of the quantum signals and suppress deterioration of an encryption key transmission speed, but still the encryption key transmission speed due to optical wavelength multiplexing may be degraded. The degradation can be suppressed by reducing the number of times of optical wavelength multiplexing.

It is assumed that the quantum communication paths (the optical fibers 101a to 101c) of three QKD systems are multiplexed in the optical fiber 103a, the classical communication paths (the optical fibers 102a to 102c) are multiplexed in the optical fiber 103b, and the optical fiber 103c is unused.

The monitor 61 monitors the states (such as a transmission status and a status of use) of the optical fibers 103a to 103c and the transmission status of the encryption key (step S11).

When the transmission speed of the encryption key monitored by the monitor 61 is in a normal state and there is the unused optical fiber 103 (the optical fiber 103c in the example of FIG. 8), the controller 62 performs multiplexing control based on the operation state of each QKD component (the transmitters 1a to 1c and the receivers 2a to 2c) from the monitor 61. Specifically, when the transmission statuses of the optical fibers 103a to 103c are normal, the controller 62 issues, to at least one of the multiplexing apparatuses 5a and 5b, an instruction to release a part of the plurality of quantum signals subjected to wavelength multiplexing and switch the transmission of the released quantum signals to the unused optical fiber 103. In the example of FIG. 8, the controller 62 issues, to at least one of the multiplexing apparatuses 5a and 5b, an instruction to partially release the wavelength multiplexing of the optical fiber 103a, allocate the optical fiber 101c to the optical fiber 103c, and allocate the optical fibers 101a and 101b to the optical fiber 103a for wavelength multiplexing (Step S12).

The multiplexer 51 of each of the multiplexing apparatuses 5a and 5b switches the allocation of the quantum communication paths based on the instruction from the controller 62 (Step S13). As a result, the number of times of optical wavelength multiplexing of the optical fiber 103a is reduced, and degradation of the encryption key transmission speed of the optical fibers 101a and 101b can be suppressed. In addition, since the optical fiber 103c is used only for the optical fiber 101c and optical wavelength multiplexing is not performed in the optical fiber 101c, degradation of the encryption key transmission speed of the optical fiber 101c is also suppressed. By releasing a part of the optical wavelength multiplexing in this manner, the encryption key transmission speed of the QKD system 200 as a whole is improved.

Figure 9:
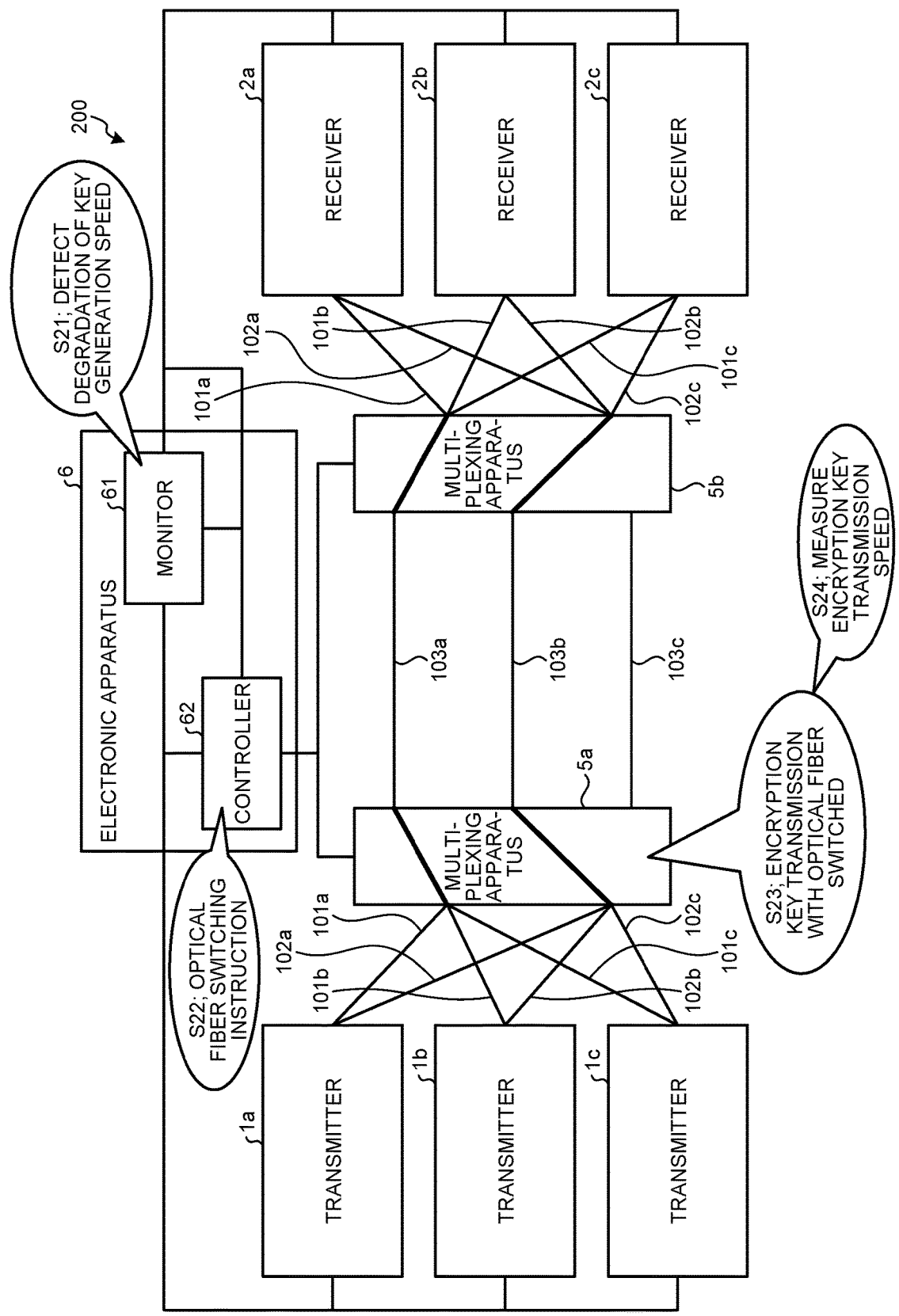
FIG. 9 is a diagram illustrating an example of quality degradation investigation control according to the first embodiment.

FIG. 9 is a diagram illustrating an example of the quality degradation investigation control according to the first embodiment. In the example of FIG. 9, control in case of investigating the cause of performance degradation is described.

It is assumed that the quantum communication paths (the optical fibers 101a to 101c) of three QKD systems are multiplexed in the optical fiber 103a, the classical communication paths (the optical fibers 102a to 102c) are multiplexed in the optical fiber 103b, and the optical fiber 103c is unused.

First, the monitor 61 detects degradation of the encryption key generation speed (Step S21) and notifies the controller 62 of a detection result indicating degradation of the encryption key generation speed. For example, when the encryption key generation speed is smaller than the generation threshold value, the monitor 61 notifies the controller 62 of a detection result indicating degradation of the encryption key generation speed. Note that, when the error rate of the quantum signal is larger than an error rate threshold, the monitor 61 may notify the controller 62 of a detection result indicating degradation of the error rate of the quantum signal.

When receiving the notification from the monitor 61, the controller 62 issues, to at least one of the multiplexing apparatuses 5a and 5b, an instruction to switch the optical fibers 103a to 103c (Step S22). For example, the controller 62 issues, to at least one of the multiplexing apparatuses 5a and 5b, an instruction to switch between the quantum communication paths (the optical fibers 101a to 101c) wavelength-multiplexed into the optical fiber 103a and the classical communication paths (the optical fibers 102a to 102c) wavelength-multiplexed into the optical fiber 103b.

In accordance with the instruction from the controller 62, the switching controllers 52 of the multiplexing apparatuses 5a and 5b switch the quantum communication paths (the optical fibers 101a to 101c) wavelength-multiplexed into the optical fiber 103a to the optical fiber 103b and switch the classical communication paths (the optical fibers 102a to 102c) wavelength-multiplexed into the optical fiber 103b to the optical fiber 103a (Step S23).

The monitor 61 receives the encryption key transmission speed measured after switching and compares the encryption key transmission speeds before and after switching (Step S24). If the encryption key transmission speed is improved, the monitor 61 specifies quality degradation of the optical fiber 103 in which degradation of the encryption key generation speed is detected in Step S21.

As described above, in the QKD system 200 according to the first embodiment, the plurality of transmitters 1a to 1c transmit the plurality of quantum signals including the encryption key information shared by the QKD and the plurality of classical signals including the control information of the QKD. The plurality of receivers 2a to 2c receive the plurality of quantum signals and the plurality of classical signals. The multiplexing apparatus 5a (first multiplexing apparatus) is connected to the plurality of transmitters 1a to 1c. The multiplexing apparatus 5b (second multiplexing apparatus) is connected to the plurality of receivers (2a to 2c). The plurality of optical fibers 103a to 103c connect the first multiplexing apparatus and the second multiplexing apparatus. The electronic apparatus 6 monitors the transmission statuses of the plurality of optical fibers 103a to 103c. The plurality of optical fibers 103 includes the optical fiber 103a (first optical fiber) in which quantum signals are wavelength-multiplexed and the optical fiber 103b (second optical fiber) in which classical signals are wavelength-multiplexed. The monitor 61 monitors a transmission status of the plurality of quantum signals flowing through the first optical fiber and a transmission status of the plurality of classical signals flowing through the second optical fiber. The controller 62 issues, to at least one of the first multiplexing apparatus and the second multiplexing apparatus, an instruction to switch the first optical fiber or the second optical fiber to another optical fiber selected from the plurality of optical fibers 103 according to the monitoring result (the receiving result) of the monitor 61.

As a result, with the QKD system 200 according to the first embodiment, it is possible to continue the transmission of the encryption key even when a defect such as disconnection occurs in the optical fiber 103 while improving the transmission speed of the encryption key by the optical wavelength multiplexing with a limited number of optical fibers 103.

Second Embodiment

Next, a second embodiment is described. In the description of the second embodiment, the description similar to that of the first embodiment is omitted, and parts different from those of the first embodiment are described. In the second embodiment, an example in which the electronic apparatus 6 performs synchronization parameter initialization control is described.

Figure 10:
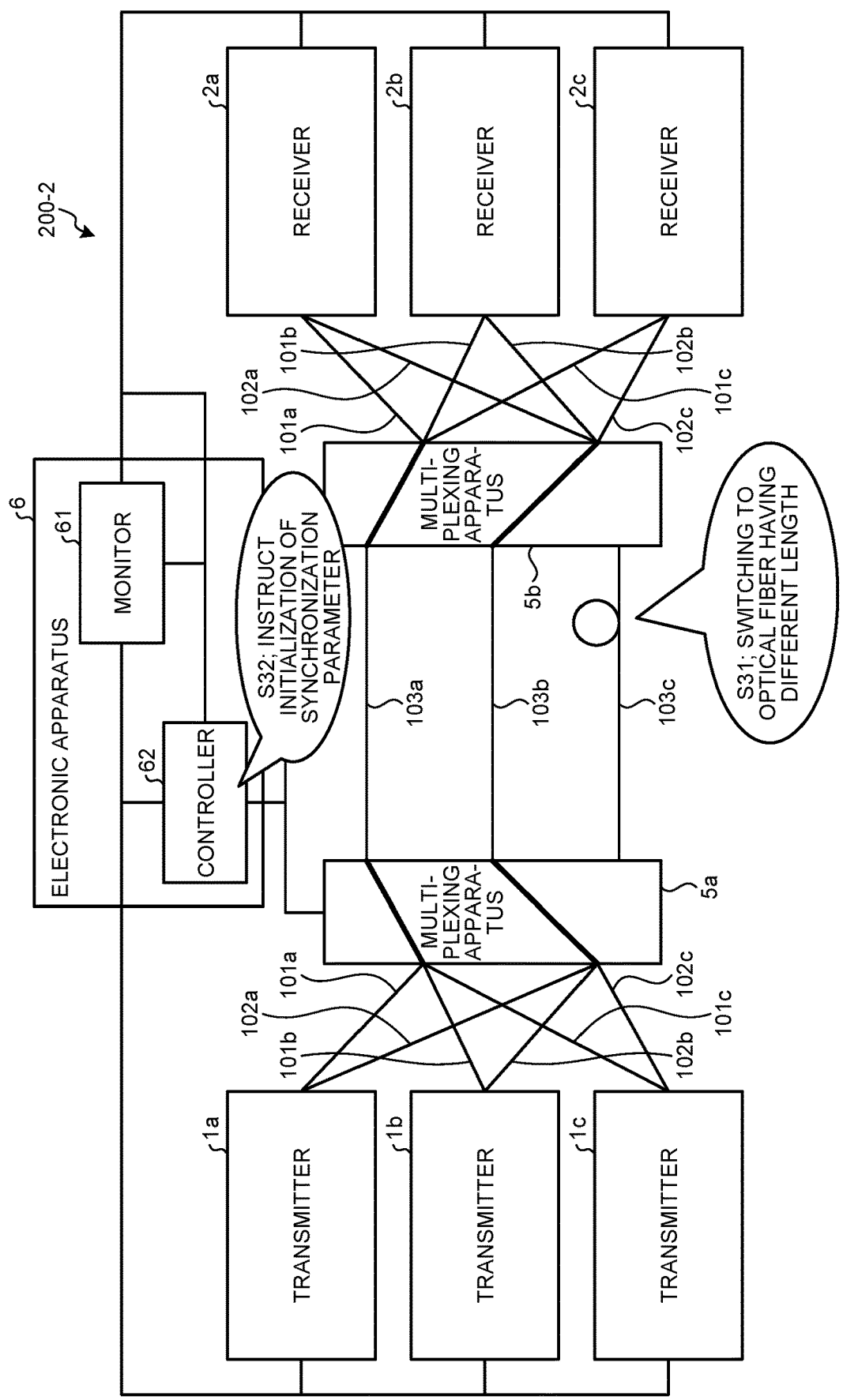
FIG. 10 is a diagram illustrating an example of synchronization parameter initialization control according to a second embodiment.

FIG. 10 is a diagram illustrating an example of synchronization parameter initialization control according to the second embodiment. When the optical fiber 103 used between the multiplexing apparatuses 5a and 5b is switched, if characteristics such as the length of the optical fiber 103 are changed before and after switching, initialization of a synchronization parameter used for synchronization of transmission and reception between the transmitter 1 and the receiver 2 may be required.

In the example of FIG. 10, the length of the optical fiber 103c is longer than the length of the optical fiber 103a. For example, it is assumed that the optical fiber 103a used for multiplexing the quantum communication paths (the optical fibers 101a to 101c) is switched to the unused optical fiber 103c by the switching control described with reference to FIG. 7 (Step S31). In such a case, the controller 62 issues, for example, an instruction to initialize the synchronization parameters to the transmitters 1a to 1c (Step S32).

Note that the instruction in Step S32 may be issued to the receivers 2a to 2c or may be issued to both the transmitters 1a to 1c and the receivers 2a to 2c.

As described above, in a QKD system 200-2 according to the second embodiment, when the characteristic of the optical fiber 103 before switching is different from the characteristic of the optical fiber 103 after switching, the controller 62 issues an instruction to initialize the synchronization parameter used for synchronization of transmission and reception between the plurality of transmitters 1a to 1c and the plurality of receivers 2a to 2c to at least one of the plurality of transmitters 1a to 1c and the plurality of receivers 2a to 2c.

As a result, with the QKD system 200-2 according to the second embodiment, even when characteristics such as the length of the optical fiber 103 change before and after switching, the same effects as those of the first embodiment can be obtained.

Third Embodiment

Next, a third embodiment is described. In the description of the third embodiment, the description similar to that of the first embodiment is omitted, and parts different from those of the first embodiment are described. In the third embodiment, an example in which the electronic apparatus 6 performs light source wavelength switching control is described.

Generally, there is only one wavelength of the quantum signal, and there is also only one wavelength of the classical signal. In order for the multiplexing apparatuses 5a and 5b to multiplex the quantum signals (signals flowing through the quantum communication paths) and the classical signals (signals flowing through the classical communication paths) transmitted from the plurality of transmitters 1a to 1c, the transmitters 1a to 1c are required to be designed and manufactured in advance such that the wavelengths of the signals thereof are different from each other.

In the transmitters 1a to 1c of the third embodiment, a plurality of quantum signal light sources that generates quantum signals having different wavelengths and a plurality of classical signal light sources that generates classical signals having different wavelengths are mounted. Hereinafter, a control method for switching the wavelength of the light source according to the transmitters 1a to 1c to be combined in multiplexing is described.

Figure 11:
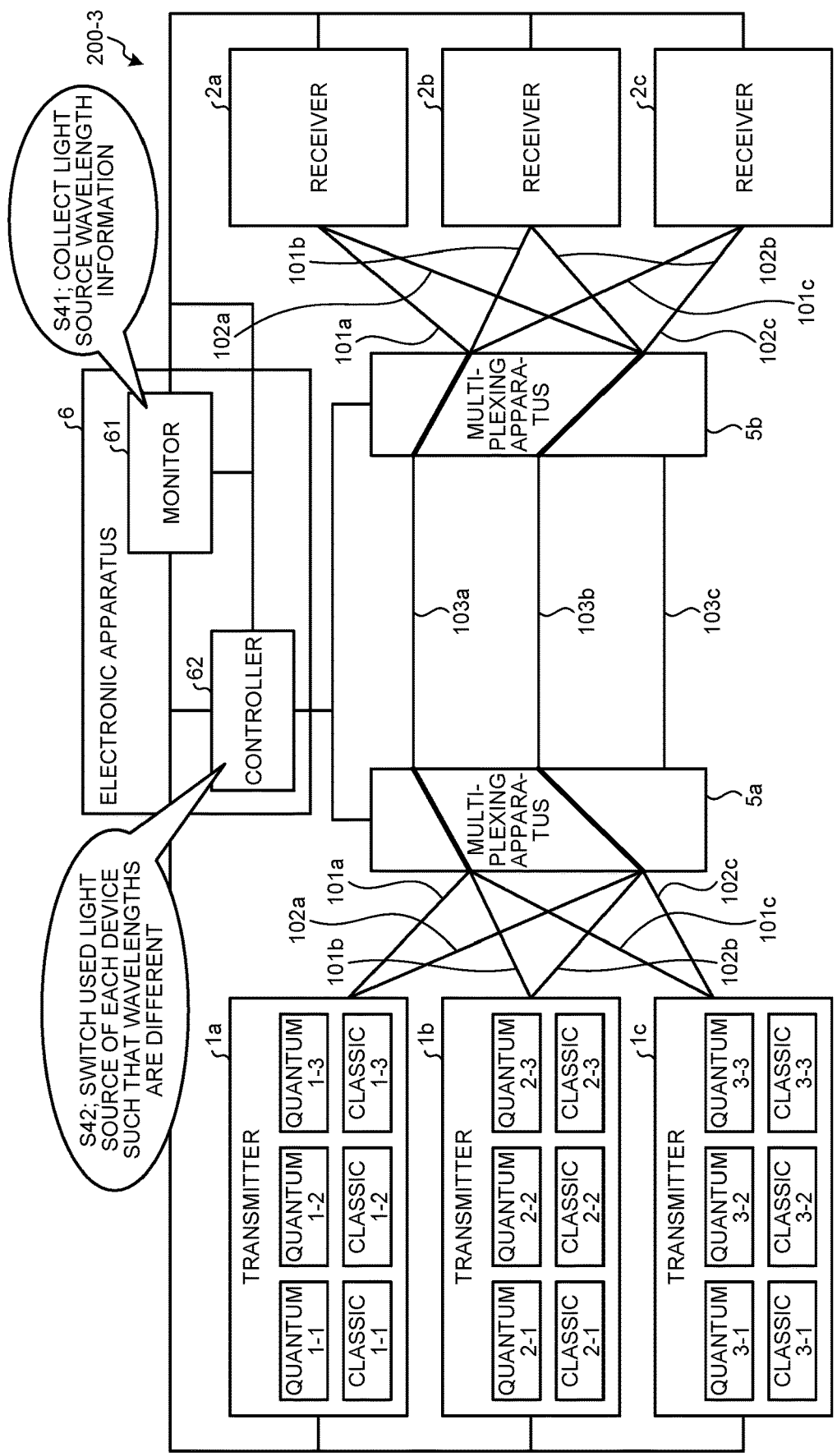
FIG. 11 is a diagram illustrating an example of light source wavelength switching control according to a third embodiment.

FIG. 11 is a diagram illustrating an example of light source wavelength switching control according to the third embodiment. In order that the multiplexing apparatuses 5a and 5b perform optical wavelength multiplexing on the quantum communication paths and the classical communication paths of the QKD components (the transmitters 1a to 1c and the receivers 2a to 2c), it is required that wavelengths of the quantum signals generated by the transmitters are different from each other, and wavelengths of the classical signals are different from each other.

The transmitter 1a of the third embodiment can generate three kinds of quantum signals (quanta 1-1 to 1-3) having different wavelengths and three kinds of classical signals (classics 1-1 to 1-3) having different wavelengths. Similarly, the transmitter 1b can generate three kinds of quantum signals (quanta 2-1 to 2-3) having different wavelengths and three kinds of classical signals (classics 2-1 to 2-3) having different wavelengths. Similarly, the transmitter 1c can generate three kinds of quantum signals (quanta 3-1 to 3-3) having different wavelengths and three kinds of classical signals (classics 3-1 to 3-3) having different wavelengths.

The monitor 61 collects the wavelength information of the light source of the quantum signal and the wavelength information of the light source of the classical signal from each of the transmitters 1a to 1c (Step S41).

Based on the wavelength information collected in Step S41, the controller 62 instructs each of the transmitters 1a to 1c to use a light source having some wavelength (Step S42).

Each of the transmitters 1a to 1c selects quantum signal light source respectively different in the transmitters 1a to 1c and classical signal light sources respectively different in the transmitters 1a to 1c based on the instruction in Step S42 and starts encryption key transmission by using the selected light source.

As described above, in a QKD system 200-3 according to the third embodiment, the controller 62 instructs the transmitters 1a to 1c such that the wavelengths of the quantum signals of the transmitters 1a to 1c are different from each other, and the wavelengths of the classical signals are different from each other. For example, by allocating light sources of wavelengths of 1550.12 nm, 1550.92 nm, and 1549.32 nm respectively to the quantum 1-1, the quantum 2-2, and the quantum 3-3 and using the quantum 1-1, the quantum 2-2, and the quantum 3-3 respectively in the transmitter 1a, the transmitter 1b, and the transmitter 1c, quantum signals having different wavelengths can be generated, and wavelength multiplexing can be performed. As a result, with the QKD system 200-3 according to the third embodiment, the multiplexing apparatuses 5a and 5b can perform wavelength multiplexing without any problem.

Finally, examples of the hardware configurations of the multiplexing apparatus 5 and the electronic apparatus 6 according to the first to third embodiments are described.

Example of Hardware Configuration

Figure 12:
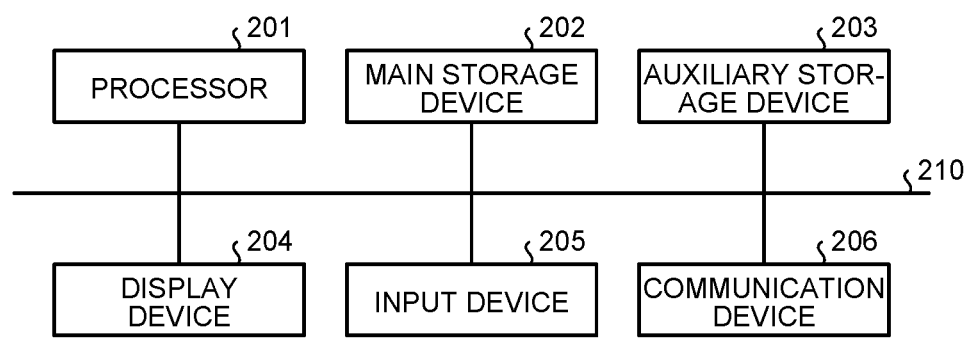
FIG. 12 is a diagram illustrating an example of a hardware configuration of a multiplexing apparatus and an electronic apparatus according to the first to third embodiments.

FIG. 12 is a diagram illustrating an example of hardware configurations of the multiplexing apparatus 5 and the electronic apparatus 6 according to the first to third embodiments. The multiplexing apparatus 5 and the electronic apparatus 6 of the first to third embodiments include a processor 201, a main storage device 202, an auxiliary storage device 203, a display device 204, an input device 205, and a communication device 206. The processor 201, the main storage device 202, the auxiliary storage device 203, the display device 204, the input device 205, and the communication device 206 are connected to each other via a bus 210.

Note that the multiplexing apparatus 5 and the electronic apparatus 6 may not include a part of the above configurations. For example, when the multiplexing apparatus 5 and the electronic apparatus 6 can use an input function and a display function of an external device, the display device 204 and the input device 205 may not be provided in the multiplexing apparatus 5 and the electronic apparatus 6.

The processor 201 executes a program read from the auxiliary storage device 203 to the main storage device 202. The main storage device 202 is a memory such as a ROM and a RAM. The auxiliary storage device 203 is a hard disk drive (HDD), a memory card, or the like.

The display device 204 is, for example, a liquid crystal display. The input device 205 is an interface for operating the multiplexing apparatus 5 and the electronic apparatus 6. Note that the display device 204 and the input device 205 may be embodied by a touch panel or the like having a display function and an input function. The communication device 206 is an interface for communicating with other devices.

For example, the program executed by the multiplexing apparatus 5 and the electronic apparatus 6 is a file in an installable format or an executable format, is recorded in a computer-readable storage medium such as a memory card, a hard disk, a CD-RW, a CD-ROM, a CD-R, a DVD-RAM, and a DVD-R, and is provided as a computer program product.

Furthermore, for example, programs to be executed by the multiplexing apparatus 5 and the electronic apparatus 6 may be configured to be stored on a computer connected to a network such as the Internet and be provided by being downloaded via the network.

Furthermore, for example, the program executed by the multiplexing apparatus 5 and the electronic apparatus 6 may be configured to be provided via a network such as the Internet without being downloaded. Specifically, for example, the control processing of the multiplexing apparatus 5 and the control processing of the electronic apparatus 6 may be configured to be executed by an application service provider (ASP) type cloud service.

In addition, for example, the programs of the multiplexing apparatus 5 and the electronic apparatus 6 may be configured to be provided by being incorporated in a ROM or the like in advance.

The program executed by the multiplexing apparatus 5 and the electronic apparatus 6 has a module configuration including functions that can be embodied by the program among the functional configurations described above. With respect to the corresponding functions, as actual hardware, the processor 201 reads a program from a storage medium and executes the program, and the functional blocks are loaded on the main storage device 202. That is, the functional blocks are generated on the main storage device 202.

Note that some or all of the functions described above may not be embodied by software but may be embodied by hardware such as an integrated circuit (IC).

In addition, each function may be embodied by using the plurality of processors 201, and in this case, each processor 201 may embody one of the functions or may embody two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A QKD quantum key distribution (QKD) system comprising:
   a plurality of transmitters configured to transmit a plurality of quantum signals including encryption key information by using a method of quantum key distribution (QKD) and transmit a plurality of classical signals including control information of the QKD;
   a plurality of receivers configured to receive the plurality of quantum signals and the plurality of classical signals;
   a first multiplexing apparatus configured to be connected to the plurality of transmitters;
   a second multiplexing apparatus configured to be connected to the plurality of receivers;
   a plurality of optical fibers configured to connect the first multiplexing apparatus and the second multiplexing apparatus; and
   an electronic apparatus configured to receive transmission statuses of the plurality of optical fibers,
   wherein
   the plurality of optical fibers includes a first optical fiber for transmitting the plurality of quantum signals that is wavelength-multiplexed by the first multiplexing apparatus, and a second optical fiber for transmitting the plurality of classical signals that is wavelength-multiplexed by the first multiplexing apparatus, and
   the electronic apparatus configured to
      receive transmission statuses of the plurality of optical fibers including transmission statuses of the plurality of quantum signals flowing through the first optical fiber and transmission statuses of the plurality of classical signals flowing through the second optical fiber; and
      issue, to at least one of the first multiplexing apparatus and the second multiplexing apparatus, an instruction to switch the first optical fiber or the second optical fiber to another optical fiber selected from the plurality of optical fibers according to the transmission statuses of the plurality of the optical fibers,
   wherein
   the plurality of optical fibers includes three or more optical fibers and at least one unused optical fiber,
   the electronic apparatus issues, to at least one of the first multiplexing apparatus and the second multiplexing apparatus, an instruction to switch the first optical fiber or the second optical fiber to the unused optical fiber selected from the plurality of optical fibers according to the transmission statuses of the plurality of the optical fibers, and
   the electronic apparatus issues, to at least one of the first multiplexing apparatus and the second multiplexing apparatus, an instruction to switch the first optical fiber to another optical fiber selected from the plurality of optical fibers when transmission of the plurality of quantum signals flowing through the first optical fiber is stopped.

2. The QKD system according to claim 1, wherein
the electronic apparatus receives, as the transmission statuses of the plurality of quantum signals flowing through the first optical fiber, at least one of an encryption key generation speed based on a quantum signal and an error rate of a quantum signal from the plurality of receivers.

3. The QKD system according to claim 2, wherein
when at least one of the encryption key generation speed being smaller than a generation threshold, or the error rate of the quantum signal being larger than an error rate threshold is detected, the electronic apparatus issues, to at least one of the first multiplexing apparatus and the second multiplexing apparatus, an instruction to switch the first optical fiber to the second optical fiber, and the electronic apparatus specifies quality degradation of the first optical fiber when the encryption key generation speed is improved after switching between the first optical fiber and the second optical fiber.

4. The QKD system according to claim 1, wherein, when the transmission statuses are normal for the plurality of optical fibers, the electronic apparatus issues, to at least one of the first multiplexing apparatus and the second multiplexing apparatus, an instruction to release a part of the plurality of quantum signals among the plurality of quantum signals transmitted in the first optical fiber and switch transmission of the part of the plurality of quantum signals released to the unused optical fiber.

5. The QKD system according to claim 1, wherein when a length of the optical fiber before switching is different from a length of the optical fiber after switching, the electronic apparatus issues, to at least one of the plurality of transmitters and the plurality of receivers, an instruction to initialize a synchronization parameter used for synchronization of transmission and reception between the plurality of transmitters and the plurality of receivers.

6. The QKD system according to claim 1, wherein the plurality of transmitters includes:
a plurality of quantum signal light sources configured to generate quantum signals having different wavelengths, and
a plurality of classical signal light sources configured to generate classical signals having different wavelengths; and
the electronic apparatus issues, to the plurality of transmitters, an instruction to use the quantum signal light source such that wavelengths of a plurality of quantum signals waveform-multiplexed in the first optical fiber are different from each other and issues, to the plurality of transmitters, an instruction to use the classical signal light source such that wavelengths of a plurality of classical signals waveform-multiplexed in the second optical fiber are different from each other.

7. An electronic apparatus configured to receive transmission statuses of a plurality of optical fibers that connects a first multiplexing apparatus connected to a plurality of transmitters and a second multiplexing apparatus connected to a plurality of receivers,
the plurality of optical fibers including a first optical fiber for transmitting a plurality of quantum signals including encryption key information and a second optical fiber for transmitting a plurality of classical signals including control information of quantum key distribution (QKD), wherein the plurality of quantum signals transmitted in the first optical fiber has been transmitted by using a method of quantum key distribution (QKD) and has been wavelength-multiplexed by the first multiplexing apparatus, and the plurality of classical signals transmitted in the second optical fiber has been wavelength-multiplexed by the first multiplexing apparatus, and
the electronic apparatus is configured to
receive transmission statuses of the plurality of optical fibers including transmission statuses of the plurality of quantum signals flowing through the first optical fiber and transmission statuses of the plurality of classical signals flowing through the second optical fiber; and
issue, to at least one of the first multiplexing apparatus and the second multiplexing apparatus, an instruction to switch the first optical fiber or the second optical fiber to another optical fiber selected from the plurality of optical fibers according to the transmission statuses of the plurality of the optical fibers, wherein
the plurality of optical fibers includes three or more optical fibers and at least one unused optical fiber,
the electronic apparatus issues, to at least one of the first multiplexing apparatus and the second multiplexing apparatus, an instruction to switch the first optical fiber or the second optical fiber to the unused optical fiber selected from the plurality of optical fibers according to the transmission statuses of the plurality of the optical fibers, and
the electronic apparatus issues, to at least one of the first multiplexing apparatus and the second multiplexing apparatus, an instruction to switch the first optical fiber to another optical fiber selected from the plurality of optical fibers when transmission of the plurality of quantum signals flowing through the first optical fiber is stopped.

8. An electronic apparatus connected to an opposed electronic apparatus by a plurality of optical fibers, the electronic apparatus comprising:
a multiplexer configured to:
receive, from a plurality of QKD components, a plurality of quantum signals including encryption key information transmitted by using a method of quantum key distribution (QKD);
receive a plurality of classical signals including control information of the QKD from a plurality of QKD components;
wavelength-multiplex the plurality of quantum signals and transmit the wavelength-multiplexed quantum signals by using a first optical fiber selected from the plurality of optical fibers; and
wavelength-multiplex the plurality of classical signals and transmit the wavelength-multiplexed classical signals by using a second optical fiber selected from the plurality of optical fibers, the plurality of optical fibers including three or more optical fibers and at least one unused optical fiber; and
a switching controller configured to switch the first optical fiber or the second optical fiber to the unused optical fiber selected from the plurality of optical fibers according to a switching instruction from the electronic apparatus,
wherein
the switching controller receives, from the electronic apparatus, the switching instruction to switch the first optical fiber or the second optical fiber to the unused optical fiber selected from the plurality of optical fibers, and
the switching controller receives, from the electronic apparatus, an instruction to switch the first optical fiber to another optical fiber selected from the plurality of optical fibers when transmission of the plurality of quantum signals flowing through the first optical fiber is stopped.

9. A method implemented by an electronic apparatus configured to receive transmission statuses of a plurality of optical fibers that connects a first multiplexing apparatus connected to a plurality of transmitters and a second multiplexing apparatus connected to a plurality of receivers, the plurality of optical fibers including a first optical fiber for transmitting a plurality of quantum signals including encryption key information and a second optical fiber for transmitting a plurality of classical signals including control information of quantum key distribution (QKD), wherein the plurality of quantum signals transmitted in the first optical fiber has been transmitted by using a method of quantum key distribution (QKD) and has been wavelength-multiplexed by the first multiplexing apparatus, and the plurality of classical signals transmitted in the second optical fiber has been wavelength-multiplexed by the first multiplexing apparatus, the method comprising:

receiving transmission statuses of the plurality of optical fibers including transmission statuses of the plurality of quantum signals flowing through the first optical fiber and transmission statuses of the plurality of classical signals flowing through the second optical fiber; and issuing, to at least one of the first multiplexing apparatus and the second multiplexing apparatus, an instruction to switch the first optical fiber or the second optical fiber to another optical fiber selected from the plurality of optical fibers according to the transmission statuses of the plurality of the optical fibers, wherein the plurality of optical fibers includes three or more optical fibers and at least one unused optical fiber, and the method further comprises:

issuing, to at least one of the first multiplexing apparatus and the second multiplexing apparatus, an instruction to switch the first optical fiber or the second optical fiber to the unused optical fiber selected from the plurality of optical fibers according to the transmission statuses of the plurality of the optical fibers; and issuing, to at least one of the first multiplexing apparatus and the second multiplexing apparatus, an instruction to switch the first optical fiber to another optical fiber selected from the plurality of optical fibers when transmission of the plurality of quantum signals flowing through the first optical fiber is stopped.

10. A computer program product having a non-transitory computer readable medium including programmed instructions stored thereon and for operating an electronic apparatus configured to receive transmission statuses of a plurality of optical fibers that connects a first multiplexing apparatus connected to a plurality of transmitters and a second multiplexing apparatus connected to a plurality of receivers, the plurality of optical fibers including a first optical fiber for transmitting a plurality of quantum signals including encryption key information and a second optical fiber for transmitting a plurality of classical signals including control information of quantum key distribution (QKD), wherein the plurality of quantum signals transmitted in the first optical fiber has been transmitted by using a method of quantum key distribution (QKD) and has been wavelength-multiplexed by the first multiplexing apparatus, and the plurality of classical signals transmitted in the second optical fiber is wavelength-multiplexed by the first multiplexing apparatus, wherein the instructions, when executed by a computer, cause the computer to:

receive transmission statuses of the plurality of optical fibers including transmission statuses of the plurality of quantum signals flowing through the first optical fiber and transmission statuses of the plurality of classical signals flowing through the second optical fiber; and issue, to at least one of the first multiplexing apparatus and the second multiplexing apparatus, an instruction to switch the first optical fiber or the second optical fiber to another optical fiber selected from the plurality of optical fibers according to the transmission statuses of the plurality of the optical fibers, wherein the plurality of optical fibers includes three or more optical fibers and at least one unused optical fiber, and the instructions further cause the computer to:

issue to at least one of the first multiplexing apparatus and the second multiplexing apparatus, an instruction to switch the first optical fiber or the second optical fiber to the unused optical fiber selected from the plurality of optical fibers according to the transmission statuses of the plurality of the optical fibers; and issue, to at least one of the first multiplexing apparatus and the second multiplexing apparatus, an instruction to switch the first optical fiber to another optical fiber selected from the plurality of optical fibers when transmission of the plurality of quantum signals flowing through the first optical fiber is stopped.

* * * * *